March 14, 1950 H. W. NORBERG 2,500,857
APPARATUS FOR MAKING PIN TYPE FLOWER HOLDERS
Filed March 29, 1948 6 Sheets-Sheet 1
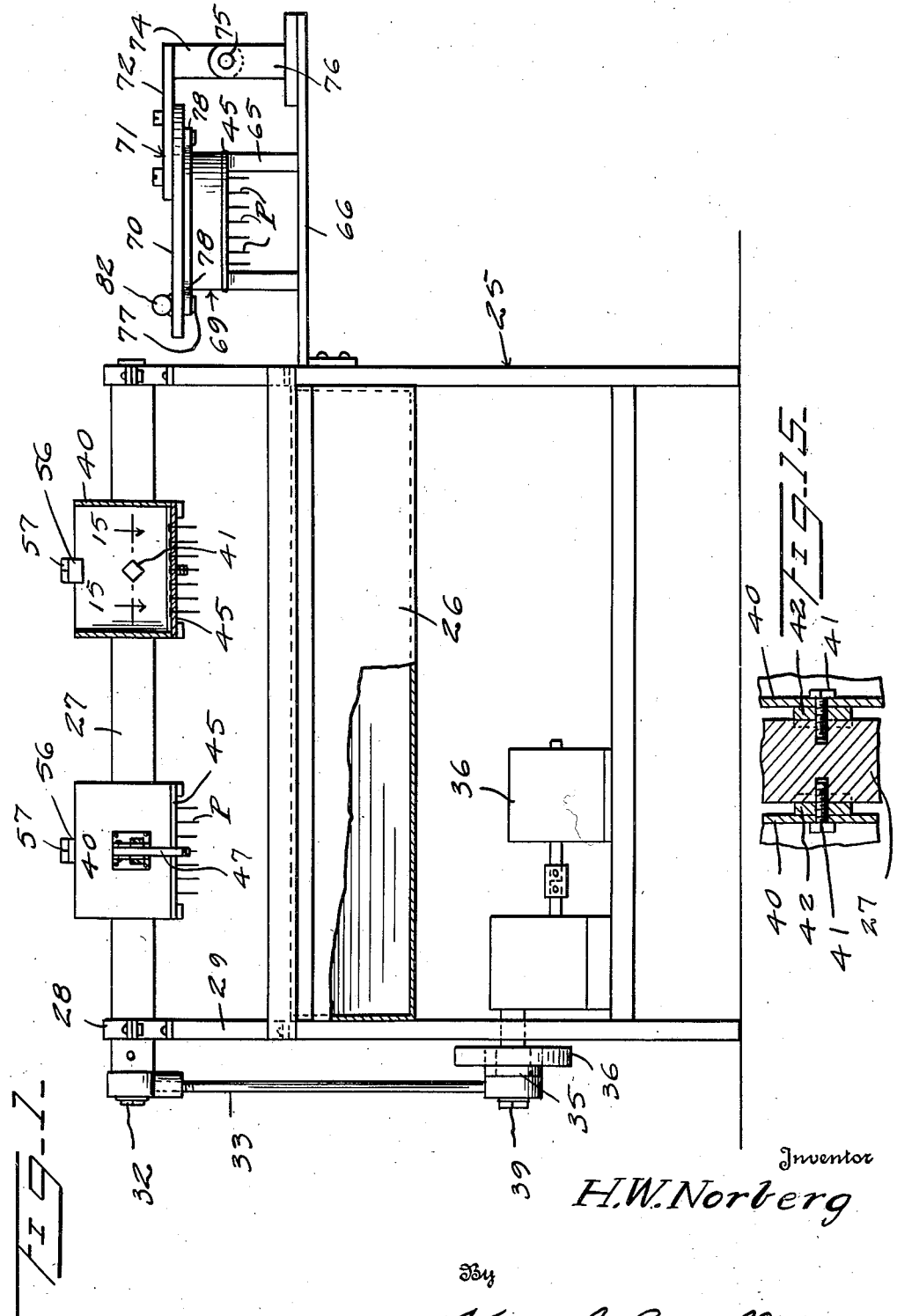
Inventor
H. W. Norberg
By
Kimmel & Crowell
Attorneys

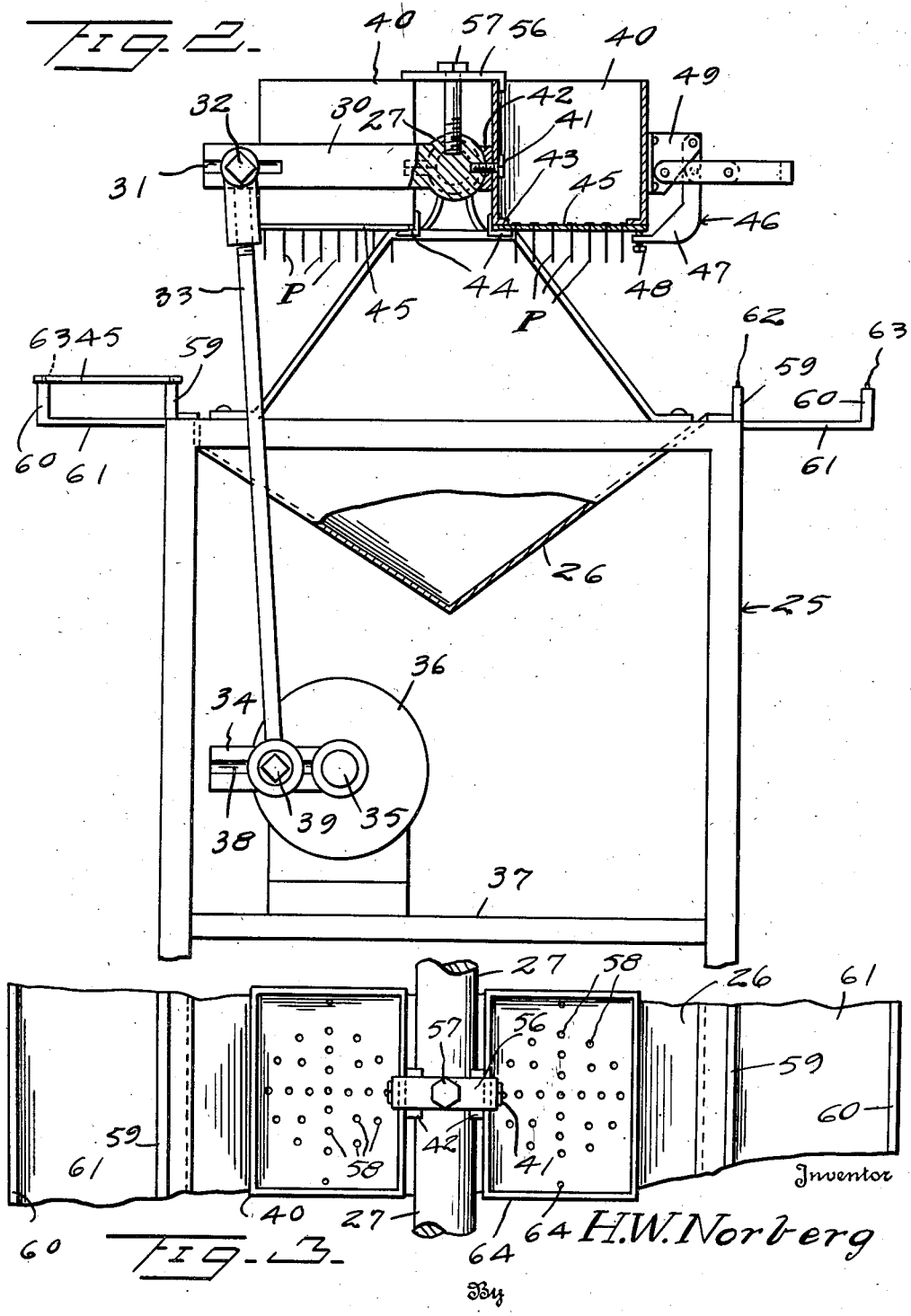

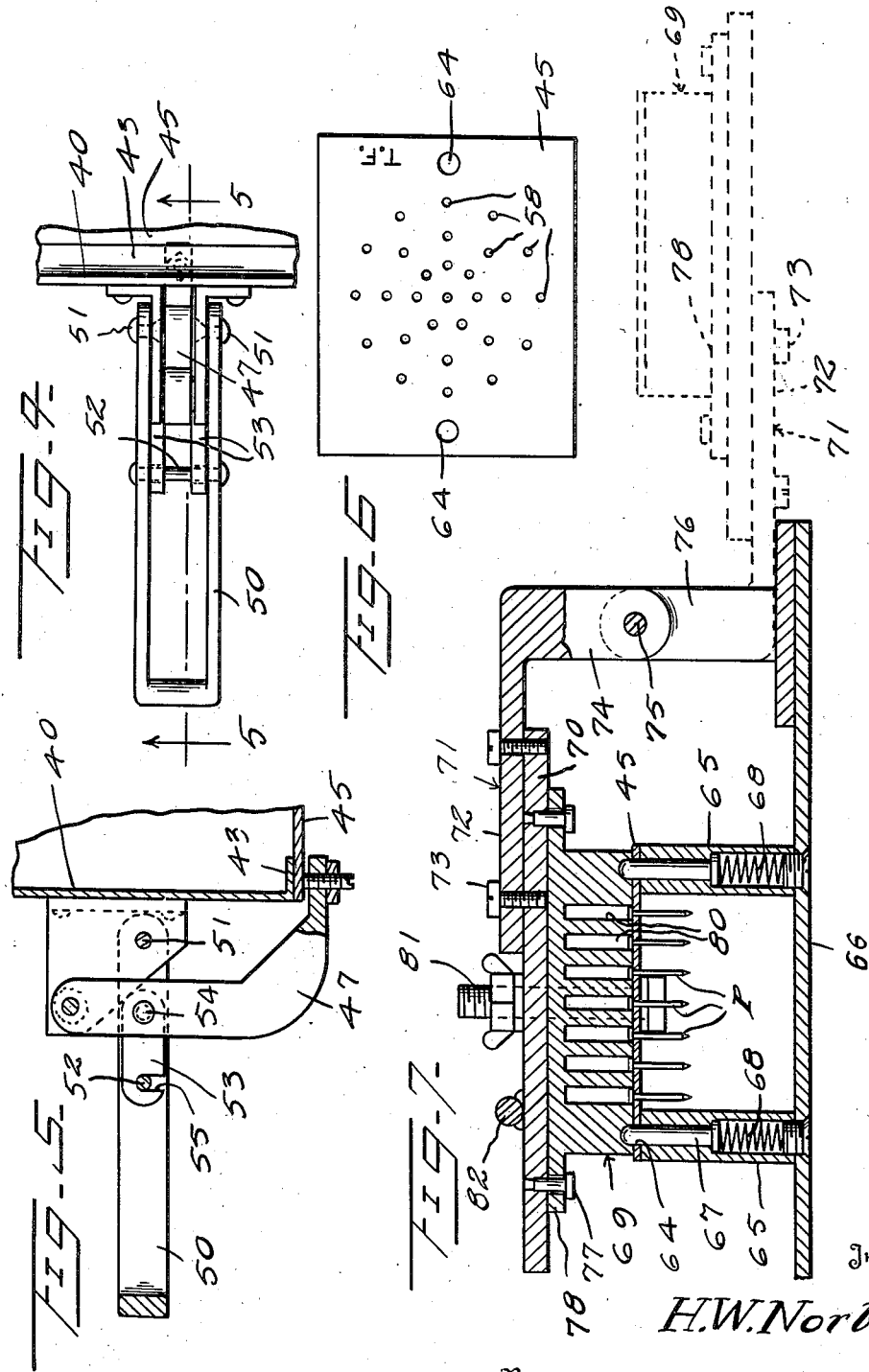

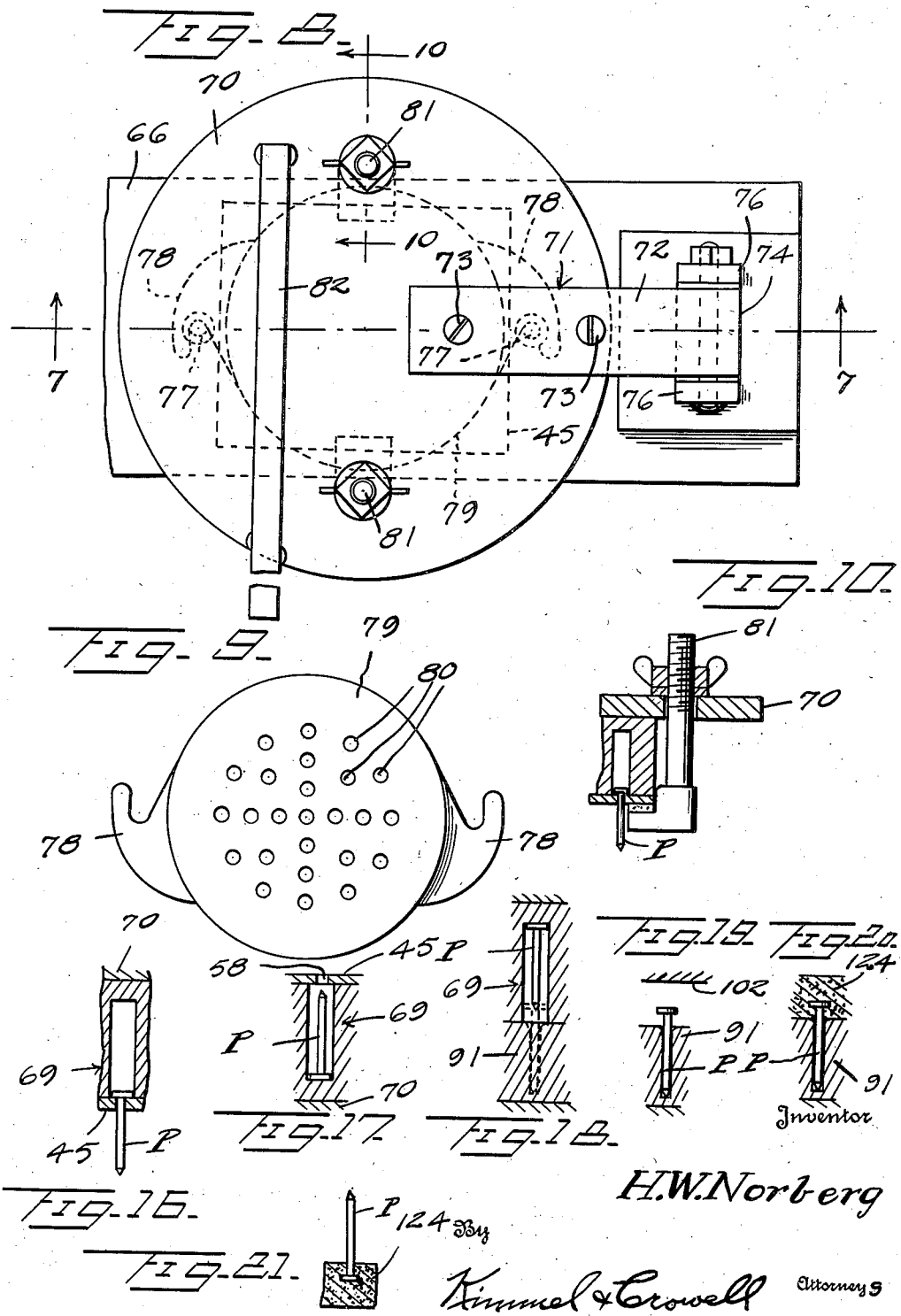

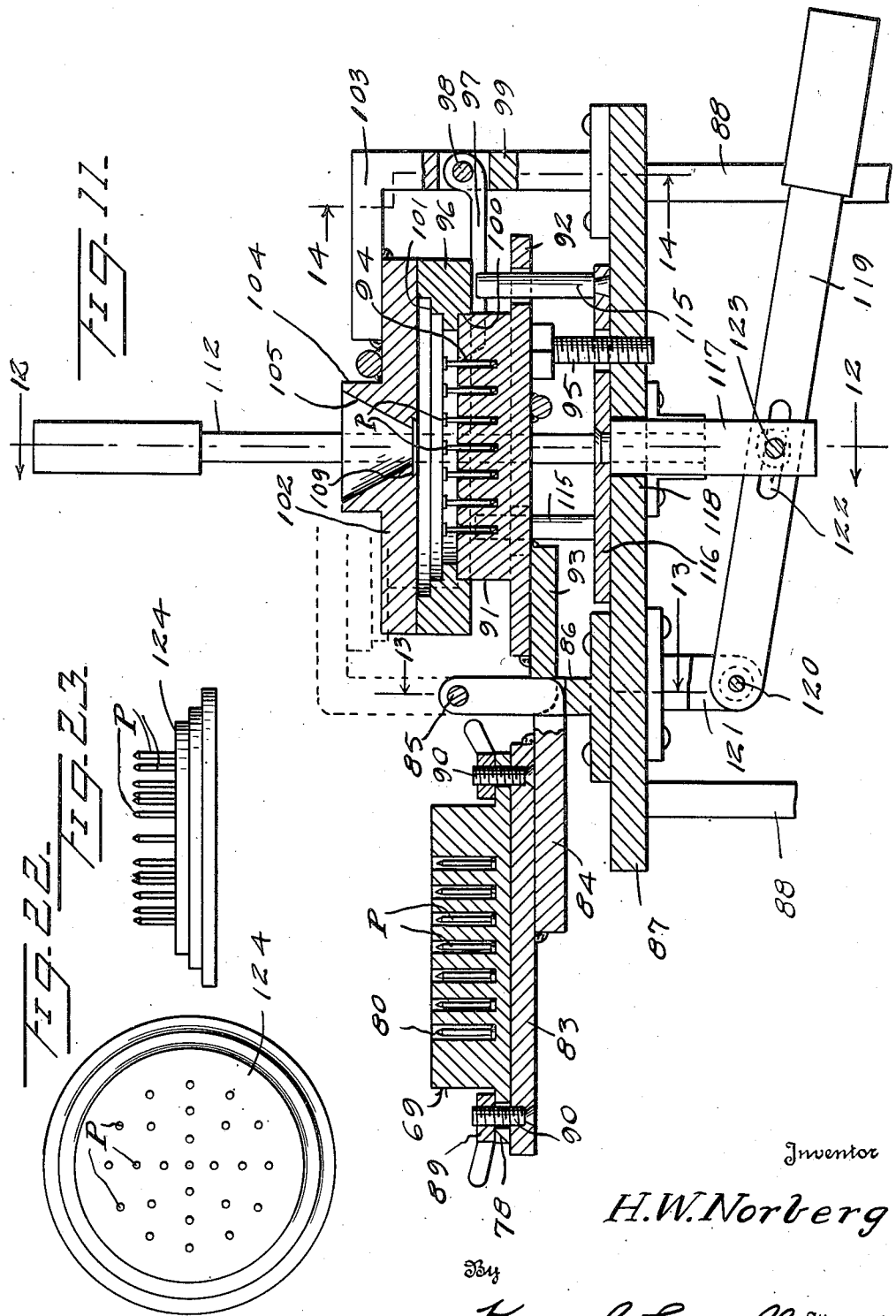

March 14, 1950      H. W. NORBERG      2,500,857
APPARATUS FOR MAKING PIN TYPE FLOWER HOLDERS
Filed March 29, 1948      6 Sheets-Sheet 6
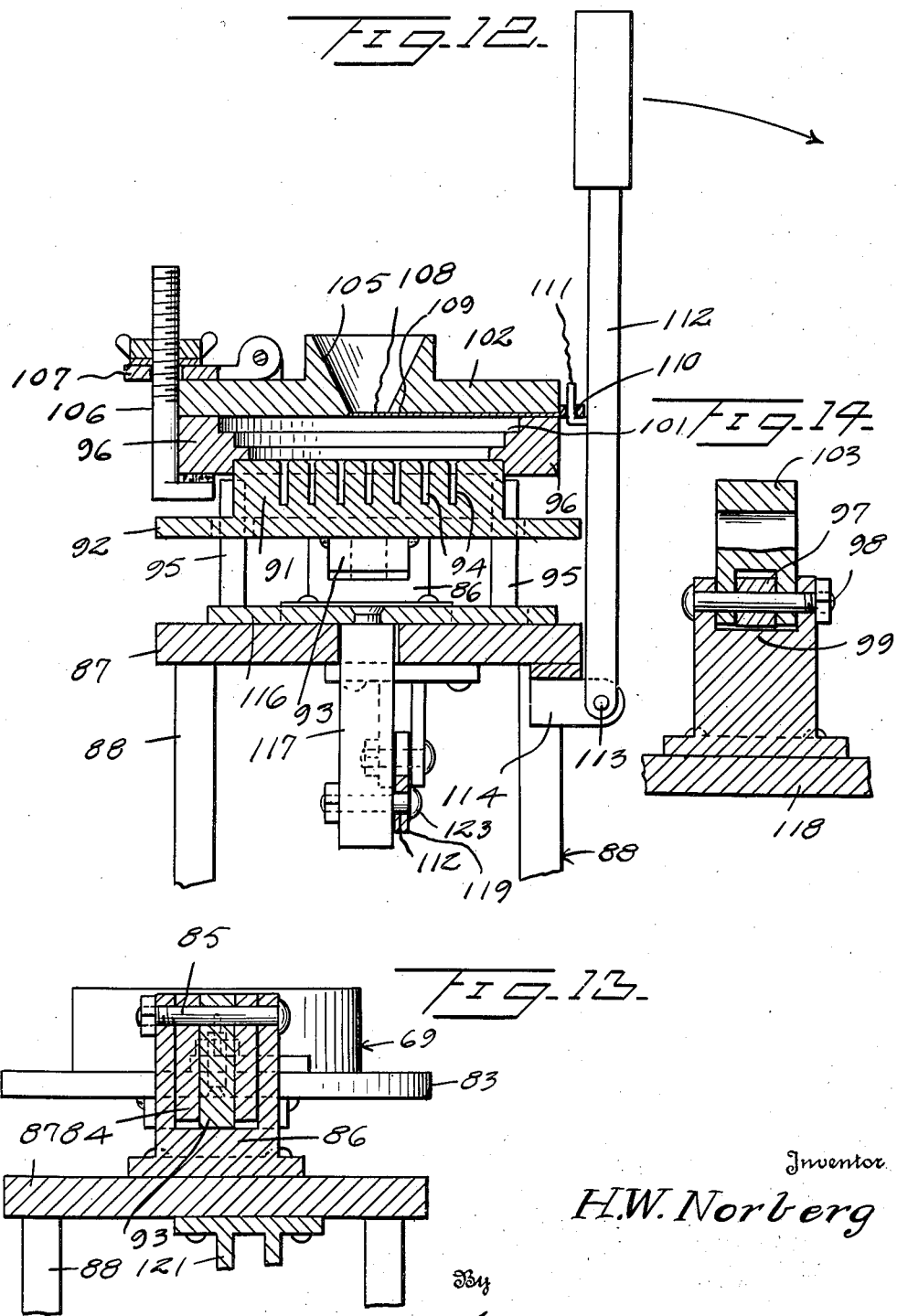
Inventor
H. W. Norberg
By Kimmel & Crowell
Attorneys Patented Mar. 14, 1950

2,500,857

UNITED STATES PATENT OFFICE 2,500,857

APPARATUS FOR MAKING PIN TYPE FLOWER HOLDERS

Hugo W. Norberg, Flint, Mich.

Application March 29, 1948, Serial No. 17,626

2 Claims. (Cl. 22—58)

This invention relates to apparatus for making flower holders of the pin type.

An object of this invention is to provide apparatus for making pin type flower holders, the apparatus including agitated means for initially filling an apertured transfer plate with pins, means for transferring the filled plate to a second plate having sockets within which the heads of the pins are adapted to engage, means for transferring the inverted pins from the second plate to a third plate which constitutes a mold bottom, and then disposing a mold member upon the third plate so that molten metal or fluid and solidifiable material may be poured into the mold and the projecting heads of the pins will be embedded within the material when the latter solidifies.

Another object of this invention is to provide in apparatus of this kind an improved means for setting a predetermined number of pins in the first transfer plate so that these pins can be subsequently transferred to the mold plate.

A further object of this invention is to provide an improved means for releasably clamping the first transfer plate onto the agitating receptacle with the plate forming a removable bottom for the receptacle.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation, partly broken away and in section of a portion of the apparatus used in making pin type flower holders.

Figure 2 is a detailed end elevation, partly broken away and in section of the structure shown in Figure 1.

Figure 3 is a fragmentary plan view of the structure shown in Figure 1 with the toggle clamps removed from the receptacles.

Figure 4 is a fragmentary plan view of one of the toggle clamps for holding the apertured bottom on a receptacle.

Figure 5 is a fragmentary sectional view taken on the line 5—5 of Figure 4.

Figure 6 is a plan view of the transfer plate forming the receptacle bottom.

Figure 7 is a sectional view taken substantially on the line 7—7 of Figure 8.

Figure 8 is a plan view of the transfer structure.

Figure 9 is a plan view of the transfer socket used in Figure 8.

Figure 10 is a fragmentary sectional view taken on the line 10—10 of Figure 8.

Figure 11 is a fragmentary vertical section of the molding structure embodied in this apparatus.

Figure 12 is a fragmentary sectional view taken on the line 12—12 of Figure 11.

Figure 13 is a fragmentary sectional view taken on the line 13—13 of Figure 11.

Figure 14 is a fragmentary sectional view taken on the line 14—14 of Figure 11.

Figure 15 is a fragmentary sectional view taken substantially on the line 15—15 of Figure 1.

Figure 16 is a fragmentary sectional view showing the initial positions of the first pair of transfer plates.

Figure 17 is a view similar to Figure 16, with the latter in inverted position.

Figure 18 is a fragmentary sectional view showing the positions of the intermediate and final transfer or mold plate.

Figure 19 is a fragmentary sectional view of the mold plate showing a pin in projecting position from the upper side of the mold plate.

Figure 20 is a fragmentary sectional view showing the mold plate with a pin embedded in the material.

Figure 21 is a fragmentary vertical section showing the holder in completed form.

Figure 22 is a plan view of the holder.

Figure 23 is a detailed side elevation of the completed holder.

Referring to the drawings and first to Figures 1 to 6 and Figure 15, the numeral 25 designates generally a frame structure which has mounted on the upper portion thereof a tray 26. The tray 26 extends across the upper end of the frame 25 and is designed for the purpose of catching surplus pins remaining in the agitating or oscillating receptacles when the first transfer plate is removed from a receptacle. The tray 26 may also constitute a pin supply holder for holding a quantity of pins which may be scooped or otherwise removed from the tray 26 and then deposited into the agitating receptacles to be hereinafter described.

The frame 25 has disposed thereabove a rock shaft 27 journalled in bearings 28 carried by upwardly extending supports 29. The shaft 27 has fixed to one end thereof an arm or crank 30 formed with a lengthwise extending slot 31 in which a headed bolt 32 engages. The bolt 32 constitutes a pivot for the upper end of a pitman 33 which at its lower end is connected to a rotatable crank 34 secured to a motor shaft 35. The motor shaft 35 is operated by a motor 36 carried by horizontally disposed supporting bars 37 fixed in the frame 25. The crank arm 34 is formed with a lengthwise extending slot or keyway 38 within which the head of a pivot bolt 39 engages, the bolt 39 engaging through the lower end of the pitman or link 33. The two pivot bolts 32 and 39 may be adjusted lengthwise of the crank members 30 and 34, respectively, to provide the desired degree of oscillation or rocking of the rock shaft 27. The shaft 27 has mounted thereon pairs of opposed receptacles 40. The receptacles 40 are polygonal in transverse section and are opened at the upper and lower ends thereof. The receptacles are secured to the shaft 27 by means of bolts or fastening members 41 and spacers 42 are interposed between the inner wall of a receptacle 40 and the shaft 27 so that the two receptacles 40 forming each pair will be disposed in parallel relation. Each receptacle is formed with an inwardly projecting lower flange 43 and with a pair of downwardly offset lugs 44 spaced downwardly from the inner flanges 43. An apertured transfer plate 45 is adapted to engage the bottom of a receptacle 40 and the inner portion of the plate 45 engages between the inner flange 43 and the pair of lugs 44. The transfer plate 45 is adapted to be removably secured to the bottom of the receptacle 40 by means of a toggle clamping structure 46. The toggle clamping structure 46 includes an L-shaped clamping member 47 having a bolt 48 threaded through the lower leg thereof engageable with the lower side of the plate 45 so as to hold the latter in tight position against the bottom of the receptacle 40 when clamping arm or jaw 47 is disposed in clamping position. The jaw or clamping member 47 is pivotally carried by an outwardly projecting bracket 49 fixed to the outer wall of the receptacle 40 and jaw 47 is adapted to be releasably locked in clamping position by means of a bifurcated lever 50 which is pivotally secured as at 51 to the bracket 49 and the lever 50 has extending between the opposite arms thereof a pin 52 which is adapted to be engaged by a link 53 pivotally carried as at 54 by the jaw 47.

The link 53 is provided with a downwardly opening slot or notch 55 which engages over the pin 42. Each pair of receptacles 40 are tied together at the upper ends by means of an inverted U-shaped tie bar 56 through which a bolt 57 extends, the bolt 57 being threaded into the shaft 27. The depending or outer sides of the holding bar 56 engages over the upper edges of the receptacles 40 and projects into the interior thereof as shown in Figure 2. When a quantity of pins are placed in each receptacle 40 and these receptacles are agitated or oscillated by rocking the shaft 27, the pins P will drop through the holes 58 which are formed in the plate 45. After the receptacles have been agitated or oscillated for a short period of time the plates 45 are removed from the bottoms of the receptacles and any pins remaining in the receptacles will drop into the tray or collector 26. In the event there are any holes 58 within which pins are not disposed the plate 45 is temporarily mounted on a pair of upstanding posts 59 and 60, the latter being carried by an outwardly extending bracket arm 61 fixed to the frame 25. The posts 59 and 60 have pins 62 and 63, respectively, extending from their upper ends which are adapted to engage in aligning holes 64 which are formed in the plate 45. When all of the holes 58 have been filled with pins, the plate 45 is shifted to a supporting structure embodying a pair of upstanding posts 65 carried by supporting plate or bar 66 extending from one end of the frame 25. The posts 65 have slidably mounted therein positioning pins 67 which are spring-pressed upwardly by means of springs 68. A socket or second transfer plate, generally designated as 69, is adapted to be releasably secured to a plate 70 which is fixed to a swingable arm or lever 71. The lever or arm 71 is of L-shaped form having a long arm 72 which is secured by fastening members 73 to the plate 70. The lever or arm 71 also includes a short vertical arm 74 which is pivotally mounted as at 75 on an upstanding support 76 which is fixed to support 66. The plate 70 has secured thereto a pair of spaced headed pins 77 which are adapted to be engaged by the notched lugs 78 which extend from the socket body 79 of the transfer member 69. The body 79 is formed with a plurality of sockets 80 which are adapted when the body 79 is inverted as shown in Figure 7 to register with the heads of the pins mounted in transfer plate 45. The transfer plate 45 is disposed on the supporting posts 65 with the positioning pins 67 engaging in the openings 64. The socket or intermediate plate 69 which is engaged with the headed pins 77 of plate 70 is then swung to an overlying position on top of transfer plate 45 as shown in Figure 7. The two plates 45 and 67 are then clamped together by means of clamping members 81. The plate 70 has fixed to the upper side thereof as viewed in Figure 7 a handle or laterally extending bar 82 so that when the two plates 45 and 69 are clamped together they may be swung as a unit through an arc of substantially 180° to the dotted line position shown in Figure 7. At this time the pins which were initially carried by transfer plate 45 will be inverted and these pins will drop down into the sockets 80 of plate 69. Transfer plate 45 is then disengaged from plate 69 and the latter plate is then shifted to another supporting plate 83 which is fixed to an L-shaped supporting member 84 pivotally mounted as at 85 on an upstanding post 86. The post 86 is fixed to a top plate 87 carried by a second frame 88.

The socket plate 69 is removably mounted on plate 83 by means of nuts 89 threaded on upstanding bolts 90 carried by plate 83. The notched lugs 78 of socket member 69 are engaged with bolts 90. A second socket plate 91 is fixed to a plate 92 and the latter is fixed to an L-shaped hinged member 93 pivotally mounted on pivot member 85. The plate or socket member 91 is formed with a plurality of sockets 94 within which pins are adapted to engage and the depth of the sockets 94 is less than the length of the pins so that a substantial portion of each pin will project above the top of plate 91 as shown in Figure 11. At the time socket member 69 is clamped onto plate 83 with pins engaging in the sockets 80, plate 92 with plate 91 is swung to the left as viewed in Figure 11 so that plate 91 will overlie plate 69 with the sockets 94 registering with sockets 80. The two plates 83 and 92 may be clamped together by any suitable means and then swung as a unit to the right until plate 92 engages a stop bolt 95. The bolt 95 is threaded through the top plate 87 of frame 88. Plate 83 with socket plate 69 is then swung back to the left or counter-clockwise to its original position, thereby leaving the pins in plate 91 with the heads of the pins projecting above this plate.

Plate 91 constitutes the bottom wall of a mold and an intermediate mold member 96 is adapted when in operative position to engage the upper portion of plate 91. Intermediate mold member 96 is swingably secured by means of an arm 97 on a pivot 98 carried by an upstanding support 99 which is fixed to plate 87. The intermediate mold member 96 is formed in the lower side thereof with an annular rabbet 100 within which the upper portion of the bottom plate 91 is adapted to engage. The intermediate mold member 96 as herein disclosed is formed with a plurality of steps or shoulders 101 forming a stepped base when the molten or initially liquid material is discharged into the mold.

A top mold plate 102 is secured to a hinge member 103 pivotally engaging pivot member 98 and plate 102 is adapted when in operative position to engage the upper side of intermediate mold member 96. Plate 102 is formed with an upstanding centrally disposed boss 102 having a funnel-shaped opening 105 so that the molten or plastic material will be directed downwardly to the center of the interior of the mold. The upper plate 102 is adapted to be clamped to the intermediate mold member 96 by means of one or more clamping members 106 which as shown in Figure 12, engage through pivoted bars 107 carried by plate 102. In order to provide for cutting off the material discharged into the interior of the mold after the mold has been filled, I have provided a sliding valve plate 108 slidable in a guide channel 109 formed in the bottom of plate 102. The outer end of valve plate or member 108 is provided with an eye 110 which is detachably engaged with an upwardly projecting hook 111 carried by a valve operating lever 112.

The lever 112 is pivotally mounted as at 113 on a supporting arm 114 fixedly carried by the frame 88. Intermediate mold member 96 is adapted to be moved upwardly after pouring of the material into the mold by means of a pair of upstanding pins 115 carried by a plate 116. The plate 116 engages on the upper side of top plate 87 and has secured to the center thereof a depending shaft or bar 117 slidable through an opening 118 formed in plate 87. An ejector operating lever 119 is pivotally mounted on a pivot 120 carried by a bracket 121 fixed to the bottom of plate 87 and lever 119 is formed with an elongated slot 122 through which a bolt 123 engages. The bolt 123 extends through the shaft 117 so that plate 116 with pins 115 may be raised or lowered by raising or lowering of lever 119. The holder which is to be formed by the apparatus hereinbefore described includes a stepped circular base 124 which has the pins P projecting upwardly therefrom, the heads of the pins being embedded in the base 124.

In the use and operation of this apparatus the first transfer plate 45 is clamped to the bottom of a receptacle 40. A supply of pins is then scooped or removed from tray or collector 26 and deposited into a receptacle 40. The shaft 27 is then rocked by operation of motor 36 so that the pins in the receptacle 40 will be agitated and certain ones of the pins will drop through the holes 58 in plate 45. When the holes of plate 45 have been substantially filled with pins projecting therethrough, plate 45 is removed from receptacle 40 and shifted to supporting posts 65.

Socket plate 69 is then disposed above plate 45 as shown in Figure 7 and the two plates 45 and 69 are clamped together by one or more clamps 81. The clamped together plates are then swung clockwise to the dotted line position shown in Figure 7. The pins will then drop downwardly into the sockets 80 whereupon plate 45 may be released from plate 69. Plate 69 is then shifted to swinging plate 83 and secured thereto by securing means 89. Mold plate 91 is swung from an operative to a pin receiving position on top of plate 69 and plates 69 and 91 may then be clamped or secured together so that they may be swung as a unit with the sockets 80 and 94 in registry. The pointed ends of the pins will drop into sockets 94 when plate 91 is lowermost and is disposed in operative position resting on stop bolt 95. Plate 69 is then released from plate 91 and swung counterclockwise to the initial position shown in full lines in Figure 11.

The mold members 96 and 102 are then swung on top of the plate 91 whereupon the material such as lead or other solidifiable material is discharged through the tapered opening 105 in plate 102. When the interior of the mold has been substantially filled, the material may be cut off by inward sliding movement of valve plate 108. At the time upper mold plate 102 is swung to an operative position eye 110 of valve plate 108 will engage hook 111 carried by valve operating lever 112, the latter being swung inwardly to a substantially vertical position so that eye 110 can readily engage over hook 111. When the material in the mold has solidified or set the mold members 96 and 102 may be raised by lifting of lever 119. The two mold members 96 and 102 may be released after being swung laterally in a clockwise direction as viewed in Figure 11 and the article may be removed from the mold members by any suitable means.

I claim:

1. Apparatus for making pin type flower holders comprising a frame, a pair of parallel extending pivot members mounted above said frame, a transfer plate formed with a plurality of upwardly opening bores to provide pin receiving sockets, a transfer plate supporting member secured to said transfer plate and pivotally connected to one of said pivot members, a mold bottom plate formed with a plurality of bores adapted to register with said bores in said transfer plate, means pivotally connecting said mold bottom plate to said one pivot member and adapted to pivot said mold bottom plate to a position overlying said transfer plate, said transfer plate and said mold bottom plate being adapted to pivot together to a position between said pair of pivot members, a split upper mold plate including an upper portion formed with a material admitting opening and a lower annular portion, means pivotally connecting said upper and lower portion to the other of said pivot members for pivoting said upper mold plate from an inoperative laterally disposed position to an operative position overlying said bottom mold plate, and ejecting means extending upwardly through said frame and engageable with said upper mold plate when the latter is in the operative position thereof and adapted to lift said upper mold plate for separating the latter from said mold bottom plate.

2. Apparatus as set forth in claim 1, wherein said mold bottom plate is formed with a plurality of spaced apart openings extending therethrough, and said ejecting means includes a vertically slidable shaft carried by said frame, a pivoted lever on said frame slidably connected to the bottom of said shaft whereby the latter is moved vertically when said lever is rocked, a plate fixed to the upper end of said shaft, and a plurality of upstanding rods carried by said plate and loosely extending through said openings in said mold bottom plate, said upstanding rods engaging said lower section of said split upper mold plate when said lever is rocked upwardly.

HUGO W. NORBERG.

REFERENCES CITED

The following references are of record in the file of this patent:

UNITED STATES PATENTS

| Number | Name | Date |
|---|---|---|
| 359,754 | Wicks | Mar. 22, 1887 |
| 1,143,861 | Pickup | June 22, 1915 |
| 1,271,849 | Campbell | July 9, 1918 |
| 1,734,122 | Glaspy | Nov. 5, 1929 |
| 2,163,964 | Prehoda | June 27, 1939 |
| 2,174,750 | King | Oct. 3, 1939 |
| 2,196,835 | Maine | Apr. 9, 1940 |
| 2,252,193 | Meyer | Aug. 11, 1941 |
| 2,358,110 | Simon | Sept. 12, 1944 |